US012350699B2

(12) United States Patent
Zou et al.

(10) Patent No.: US 12,350,699 B2
(45) Date of Patent: Jul. 8, 2025

(54) PUMP BODY STRUCTURE AND FOAM PUMP

(71) Applicant: Foshan Changtuo Packaging Technology Co., Ltd., Guangdong (CN)

(72) Inventors: Jianwen Zou, Guangdong (CN); Wenqiang Yang, Guangdong (CN)

(73) Assignee: Foshan Changtuo Packaging Technology Co., Ltd., Guangdong (CN)

( * ) Notice: Subject to any disclaimer, the term of this patent is extended or adjusted under 35 U.S.C. 154(b) by 0 days.

(21) Appl. No.: 17/923,479

(22) PCT Filed: Nov. 26, 2021

(86) PCT No.: PCT/CN2021/133565
§ 371 (c)(1),
(2) Date: Nov. 4, 2022

(87) PCT Pub. No.: WO2023/092461
PCT Pub. Date: Jun. 1, 2023

(65) Prior Publication Data
US 2025/0041883 A1 Feb. 6, 2025

(51) Int. Cl.
*B05B 7/00* (2006.01)
*A47K 5/12* (2006.01)
(Continued)

(52) U.S. Cl.
CPC .......... *B05B 7/0018* (2013.01); *A47K 5/1205* (2013.01); *A47K 5/14* (2013.01);
(Continued)

(58) Field of Classification Search
CPC ............... B05B 7/0018; B05B 11/0062; B05B 11/1001; B05B 11/1077; B05B 7/0037;
(Continued)

(56) References Cited

U.S. PATENT DOCUMENTS 6,209,759 B1 * 4/2001 Hermouet ........... B05B 11/1023 222/321.2
6,923,346 B2 * 8/2005 Foster ................. B05B 11/1087 222/145.5
2010/0111735 A1 5/2010 Tu

FOREIGN PATENT DOCUMENTS

CN 202624901 U 12/2012
CN 205574594 U 9/2016
(Continued)

OTHER PUBLICATIONS

PCT Application No. PCT/CN2021/133565, International Search Report and Written Opinion dated Aug. 11, 2022.
(Continued)

*Primary Examiner* — Frederick C Nicolas
(74) *Attorney, Agent, or Firm* — Lathrop GPM LLP; Tucker Griffith

(57) ABSTRACT

A pump body structure includes: an air inlet cylinder, an air inlet cavity being arranged inside the air inlet cylinder, and an air return hole being arranged in a bottom portion of the air inlet cylinder; a liquid inlet cylinder connected to the bottom portion of the air inlet cylinder; a lower cover connected to the bottom portion of the air inlet cylinder, a cavity being defined by the lower cover, an outer side wall of the liquid inlet cylinder and a bottom wall of the air inlet cylinder, and an air return channel being reserved between the lower cover and the liquid inlet cylinder; and an elastic stop valve arranged in the cavity, the elastic stop valve being configured for elastically covering a bottom portion of the air return hole.

9 Claims, 8 Drawing Sheets

(51) Int. Cl.
*A47K 5/14* (2006.01)
*B05B 11/00* (2023.01)
*B05B 11/04* (2006.01)
*B05B 11/10* (2023.01)

(52) U.S. Cl.
CPC .......... *B05B 7/0025* (2013.01); *B05B 7/0037* (2013.01); *B05B 11/0044* (2018.08); *B05B 11/0059* (2013.01); *B05B 11/0062* (2013.01); *B05B 11/045* (2013.01); *B05B 11/1001* (2023.01); *B05B 11/1077* (2023.01); *B05B 11/1087* (2023.01); *B05B 11/1047* (2023.01)

(58) Field of Classification Search
CPC ............. B05B 11/0044; B05B 11/0059; B05B 11/1047; B05B 11/1087; B05B 7/0025; B05B 11/045; A47K 5/1205; A47K 5/14
See application file for complete search history.

(56) References Cited

FOREIGN PATENT DOCUMENTS

| | | | |
|---|---|---|---|
| CN | 108378744 | A | 8/2018 |
| CN | 208799138 | U | 4/2019 |
| CN | 110182459 | A | 8/2019 |
| CN | 213769718 | U | 7/2021 |
| CN | 213800996 | U | 7/2021 |
| CN | 113200234 | A | 8/2021 |
| CN | 216637457 | U | 5/2022 |
| EP | 1199105 | A1 | 4/2002 |
| JP | 1993054361 | U | 7/1993 |
| JP | 1995291333 | A | 11/1995 |
| KR | 20130002834 | U | 5/2013 |
| KR | 101869042 | B1 | 6/2018 |

OTHER PUBLICATIONS

Japan Patent Office (JPO). First Search Report for CNL Application No. 2022-567890 and English translation, mailed Jan. 16, 2024. pp. 1-7.

Patent Office of the Republic of Korea (KR). First Search Report for CNL Application No. 10-2022-7038959 and English translation, mailed Dec. 5, 2023. pp. 1-8.

The State Intellectual Property Office of People's Republic of China. First Search Report for CNL Application No. 202111428529.X and English translation, mailed May 23, 2024, pp. 1-5.

The State Intellectual Property Office of People's Republic of China. First Office Action for CN Application No. 202111428529.X and English translation, mailed May 25, 2024, pp. 1-8.

* cited by examiner

PUMP BODY STRUCTURE AND FOAM PUMP

CROSS-REFERENCE TO RELATED APPLICATIONS

This application is a national stage filing under 35 U.S.C. § 371 of international application number PCT/CN2021/133565, filed Nov. 26, 2021, the content of which are incorporated herein by reference in their entirety.

TECHNICAL FIELD

The disclosure relates to the field of foam pumps, and particularly to a pump body structure and a foam pump.

BACKGROUND

A liquid storage container stores a cleaning liquid such as a hand sanitizer or a facial cleanser, and a foam pump is mounted on the liquid storage container. The foam pump is provided with an air cavity and a liquid cavity, the liquid in the liquid storage container is sucked into the liquid cavity, and air in the air cavity is mixed with the liquid in the liquid cavity by pressing a piston to form foam to be sprayed out. Generally, the foam pump is provided with an air return hole communicated with an inner cavity of the liquid storage container, air is supplemented to the liquid storage container through the air return hole to balance an air pressure in the liquid storage container, and an elastic stop valve is provided to block the air return hole, thus avoiding the liquid from flowing back from the air return hole. However, when the liquid storage container is toppled or shaken, the liquid in the liquid storage container is easily contacted with and attached to a surface of the elastic stop valve, and the liquid is contacted with the elastic stop valve for a long time, which causes hardening of the elastic stop valve to lose a stop capability.

SUMMARY

The disclosure aims to provide a pump body structure and a foam pump to address one or more technical problems in the existing technology, and at least provide a beneficial selection or creation condition.

The technical solutions used to address the above technical problems are as follows.

A pump body structure includes:

- an air inlet cylinder, wherein an air inlet cavity is arranged inside the air inlet cylinder, and an air return hole communicating the air inlet cavity with a space below the air inlet cylinder is arranged in a bottom portion of the air inlet cylinder;
- a liquid inlet cylinder connected to the bottom portion of the air inlet cylinder;
- a lower cover connected to the bottom portion of the air inlet cylinder, wherein a cavity is defined by the lower cover, an outer side wall of the liquid inlet cylinder and a bottom wall of the air inlet cylinder, and an air return channel communicating the cavity with a space below the lower cover is reserved between the lower cover and the liquid inlet cylinder; and
- an elastic stop valve arranged in the cavity: wherein the elastic stop valve is configured for elastically covering a bottom portion of the air return hole.

The beneficial effects of the disclosure are as follows. The pump body structure is assembled to the foam pump and mounted in a liquid storage container together with the foam pump, the liquid inlet cylinder is configured for sucking a liquid in the liquid storage container, while the air return hole in the bottom portion of the air inlet cylinder is configured for communicating the air inlet cavity with an inner cavity of the liquid storage container, and the elastic stop valve is configured for elastically covering the bottom portion of the air return hole, thus avoiding the liquid in the liquid storage container from flowing back into the air inlet cavity from the air return hole. When the liquid in the liquid storage container is discharged through the liquid inlet cylinder, an air pressure in the liquid storage container is reduced, and since an air pressure in the air inlet cavity is greater than that of the liquid storage container, air in the air inlet cylinder squeezes a top portion of the elastic stop valve to be deformed downwardly from the air return hole, so that a gap is formed between the elastic stop valve and the bottom portion of the air return hole, the air enters the cavity from the air return hole, and the air in the cavity enters the liquid storage container through the air return channel to balance the air pressure in the liquid storage container When the air pressure in the air inlet cavity and the air pressure in the liquid storage container are balanced, the top portion of the elastic stop valve recovers to an original state and covers the air return hole, when the liquid storage container is toppled or shaken, since the elastic stop valve is protected in the cavity, the liquid is difficult to splash onto the elastic stop valve, the lower cover blocks a large amount of splashed liquid, and if the liquid enters the cavity through the air return channel, due to a small volume of the cavity, the amount of the liquid entering the cavity is small, and the contact area between the liquid and the elastic stop valve is reduced, thus reducing the area of the elastic stop valve soaked in the liquid, and reducing the part of the elastic stop valve hardened due to long-time soaking in the liquid.

As a further improvement of the above technical solution, the lower cover is provided with an assembly hole extending vertically across the lower cover, the assembly hole is arranged around the liquid inlet cylinder, the cavity is arranged to surround a periphery of the liquid inlet cylinder for one circle, the air return channel is located between an inner wall of the assembly hole and the outer side wall of the liquid inlet cylinder, the elastic stop valve is arranged around the liquid inlet cylinder along the cavity, and a top portion of the lower cover is arranged to abut against the elastic stop valve.

The assembly hole of the lower cover is arranged around the liquid inlet cylinder, so that the lower cover, the outer side wall of the liquid inlet cylinder and a bottom wall of the air inlet cylinder form the annular cavity, the elastic stop valve is arranged around the liquid inlet cylinder along the annular cavity, so that the elastic stop valve is connected with the liquid inlet cylinder, the top portion of the lower cover abuts against the elastic stop valve, which avoids the elastic stop valve from loosening downwardly from the liquid inlet cylinder, so that the elastic stop valve can be stably mounted outside the liquid inlet cylinder, and when air squeezes the top portion of the elastic stop valve from the air return hole, the elastic stop valve is prevented by the lower cover from moving downwardly, thus ensuring that the elastic stop valve can cover the bottom portion of the air return hole when recovering to the original state.

As a further improvement of the above technical solution, a bottom surface of the air inlet cylinder is provided with an upwardly concave cavity, the air return hole is located in a top wall of the concave cavity, a portion top of the liquid inlet cylinder is connected to the top wall of the concave cavity, and an outer side wall of the lower cover is hermetically connected with an inner side wall of the concave cavity.

The air return hole is located in the concave cavity of the bottom surface of the air inlet cylinder, the outer side wall of the lower cover is hermetically connected with the inner side wall of the concave cavity, the closed cavity is formed by the top wall of the concave cavity, the outer side wall of the liquid inlet cylinder and the lower cover, and the air return channel becomes the only channel communicating the cavity with the space below: When air in the cavity flows to the space below through the air return channel, air can promote the air in the cavity to be discharged downwardly from the air return channel, thus being conductive to reducing accumulated liquid in the cavity.

As a further improvement of the above technical solution, the top wall of the concave cavity is provided with a first air guide groove communicated with the bottom portion of the air return hole, the first air guide groove is arranged to extend towards the liquid inlet cylinder, the outer side wall of the liquid inlet cylinder is provided with a second air guide groove extending up and down, the second air guide groove is communicated with the first air guide groove, a top portion of the elastic stop valve is arranged to elastically cover the air return hole and the first air guide groove, and an inner hole wall of the elastic stop valve is arranged to elastically cover with the second air guide groove.

The first air guide groove on the top wall of the concave cavity is communicated with the second air guide groove on the outer side wall of the liquid inlet cylinder, so that an air flow channel is formed by the air return hole, the first air guide groove and the second air guide groove, while the elastic stop valve elastically covers the air flow channel, thus avoiding the liquid from flowing back to the air return hole from the air flow channel. When an air pressure difference exists between the air inlet cavity and the space below: air in the air inlet cavity is first filled in the air return hole, the first air guide groove and the second air guide groove and pushes a corresponding position of the elastic stop valve, and then the air squeezes the bottom portion of the elastic stop valve to be expanded outwardly and flows into the space below, thus being conductive to reducing the air pressure difference required for communicating the air inlet cylinder with the space below.

As a further improvement of the above technical solution, the elastic stop valve includes an upper portion and a lower portion, the upper portion is arranged to be elastically pressed between the inner side wall of the concave cavity and the outer side wall of the liquid inlet cylinder, a top wall of the upper portion is arranged to elastically cover the air return hole and the first air guide groove, an inner side wall of the upper portion is arranged to elastically cover the second air guide groove, an inner side wall of the lower portion is attached to the outer side wall of the liquid inlet cylinder, a gap is reserved between an outer side wall of the lower portion and the lower cover, and the top portion of the lower cover is arranged to abut against a bottom portion of the upper portion.

The elastic stop valve is divided into the upper portion and the lower portion, the upper portion is elastically pressed between the inner side wall of the concave cavity and the outer side wall of the liquid inlet cylinder, and the top portion of the lower cover abuts against the bottom portion of the upper portion, so that the upper portion is firmly fixed, thus avoiding the upper portion from moving downwardly, and ensuring that the top wall of the upper portion elastically covers the bottom portion of the air return hole and the bottom portion of the first air guide groove, and the inner side wall of the upper portion elastically covers the second air guide groove, while the inner side wall of the lower portion is attached to the outer side wall of the liquid inlet cylinder, and the gap is reserved between the outer side wall of the lower portion and the lower cover, so that the lower portion has an margin for outward expansion. When the air pressure difference exists between the air inlet cavity and the space below: the air in the air inlet cavity is first filled into the air return hole, the first air guide groove and the second air guide groove, then the air expands outwardly to the lower portion, the air flows into the cavity from the gap between the lower portion and the outer side wall of the liquid inlet cylinder, and the air flows to the space blow from the air return channel.

As a further improvement of the above technical solution, an inner side wall of the assembly hole is hermetically connected with the outer side wall of the liquid inlet cylinder, the inner side wall of the assembly hole is provided with a groove extending vertically across the inner side wall, and the air return channel is formed between the groove and the outer side wall of the liquid inlet cylinder.

The inner side wall of the assembly hole of the lower cover is hermetically connected with the outer side wall of the liquid inlet cylinder, and the air return channel is formed between the groove of the inner side wall of the assembly hole and the outer side wall of the liquid inlet cylinder, so that the liquid cannot penetrate into the cavity through the gap between the inner side wall of the assembly hole and the outer side wall of the liquid inlet cylinder, thus ensuring that the air return channel is the only channel communicating the cavity with the space below: When the liquid enters the cavity from the air return channel, the liquid needs to flow through the air return channel to flow into the cavity and the air in the cavity needs to flow through the air return channel to flow to the space below; and the air in the cavity effectively prevents the liquid from flowing in, thus greatly reducing the liquid flowing into the cavity.

As a further improvement of the above technical solution, the outer side wall of the liquid inlet cylinder is provided with an annular bulge, and an inner hole wall of the elastic stop valve is arranged to abut against the annular bulge.

The annular bulge on the outer side wall of the liquid inlet cylinder abuts against the inner hole of the elastic stop valve, thus being conductive to fixing the elastic stop valve, and avoiding the elastic stop valve from loosening from the liquid inlet cylinder.

A foam pump includes:

the pump body structure above, wherein a liquid inlet cavity is arranged inside the liquid inlet cylinder, and a liquid inlet hole communicated with outside is arranged in the bottom portion of the liquid inlet cylinder;

a first piston assembly arranged in the air inlet cavity in an up-down sliding manner, wherein a mixing cavity communicated with a space above is arranged in a top portion of the first piston assembly;

a second piston assembly, wherein a top portion of the second piston assembly is connected with the first piston assembly, a bottom portion of the second piston assembly is arranged in the liquid inlet cavity in an up-down sliding manner, and the top portion of the first piston assembly is communicated with the mixing cavity;

a foam generating mechanism arranged in the mixing cavity; and a one-way valve covering the liquid inlet hole, wherein the one-way valve has a flow direction from bottom to top.

The foam pump is mounted on a mouth of the liquid storage container, the first piston assembly is pressed downwardly, and the first piston assembly compresses a space in the air inlet cavity and the second piston assembly compresses a space in the liquid inlet cavity: so that the air in the air inlet cavity is discharged into the mixing cavity through the first piston assembly and the liquid in the liquid inlet cavity is discharged into the mixing cavity through the second piston assembly, and the air and the liquid are mixed in the mixing cavity and then form foam under an action of the foam generating mechanism to be sprayed out. When the first piston assembly is pulled up, the second piston assembly and the first piston assembly recover to original positions. Since the amount of the air in the air inlet cavity is reduced, the air pressure in the air inlet cavity is lower than an external air pressure, and external air enters the air inlet cavity through the first piston assembly. Since the amount of the liquid in the liquid inlet cavity is reduced, a liquid in the liquid storage container flows into the liquid inlet cavity from bottom to top through the one-way valve from the liquid inlet hole, and the amount of the liquid in the liquid storage container is reduced, so that an air pressure in the liquid storage container is lower than the external air pressure. When the air pressure in the air inlet cavity is balanced with the external air pressure, the air pressure in the air inlet cavity is greater than that in the liquid storage container, and the air pressure makes the top portion of the elastic stop valve deform downwardly: so that the gap is formed between the top portion of the elastic stop valve and the bottom wall of the air inlet cylinder, and then the air in the air inlet cavity is supplemented into the liquid storage container from the air return hole, so that the air pressure in the liquid storage container is balanced with the air pressure in the air inlet cavity. The foam pump has a smoother operating action to generate the foam and a better foam generating effect.

As a further improvement of the above technical solution, the foam pump further includes an upper cover, the upper cover is connected to the top portion of the air inlet cylinder, a mounting seat extending towards an exterior of the air inlet cylinder is arranged in a bottom portion of the upper cover, the mounting seat is arranged around the air inlet cylinder for one circle, a mounting space is formed between an inner side wall of the mounting seat and the outer side wall of the air inlet cylinder, and a sealing ring is arranged in a top portion of the mounting space.

The foam pump is mounted on the liquid storage container, the liquid inlet cylinder and the air inlet cylinder are both inserted into the inner cavity of the liquid storage container, the mounting space is formed between the inner side wall of the mounting seat of the upper cover and the outer side wall of the air inlet cylinder, the mouth of the liquid storage container is inserted into the mounting space, and a top portion of the mouth is pressed against the sealing ring, so that a sealing structure is formed by the mouth of the liquid storage container, the outer side wall of the air inlet cylinder and the inner side wall of the mounting seat, thus avoiding the liquid inside the liquid storage container from overflowing from the mouth when the liquid storage container is toppled or shaken.

As a further improvement of the above technical solution, the foam pump further includes an elastic member, the elastic member is a plastic spring, the elastic member is arranged in the air inlet cavity, and upper and lower ends of the elastic member are arranged to respectively abut against the top portion of the second piston assembly and a bottom wall of the air inlet cavity.

The first piston assembly and the second piston assembly automatically rebound upwardly through the elastic member, so that the foam pump is used more conveniently. The elastic member is a plastic spring, and the foam pump has an all-plastic structure, so that the foam pump can be recycled as a whole without disassembling the elastic member separately.

BRIEF DESCRIPTION OF THE DRAWINGS

The disclosure is further described hereinafter with reference to the drawings and the embodiments.

Figure 1:
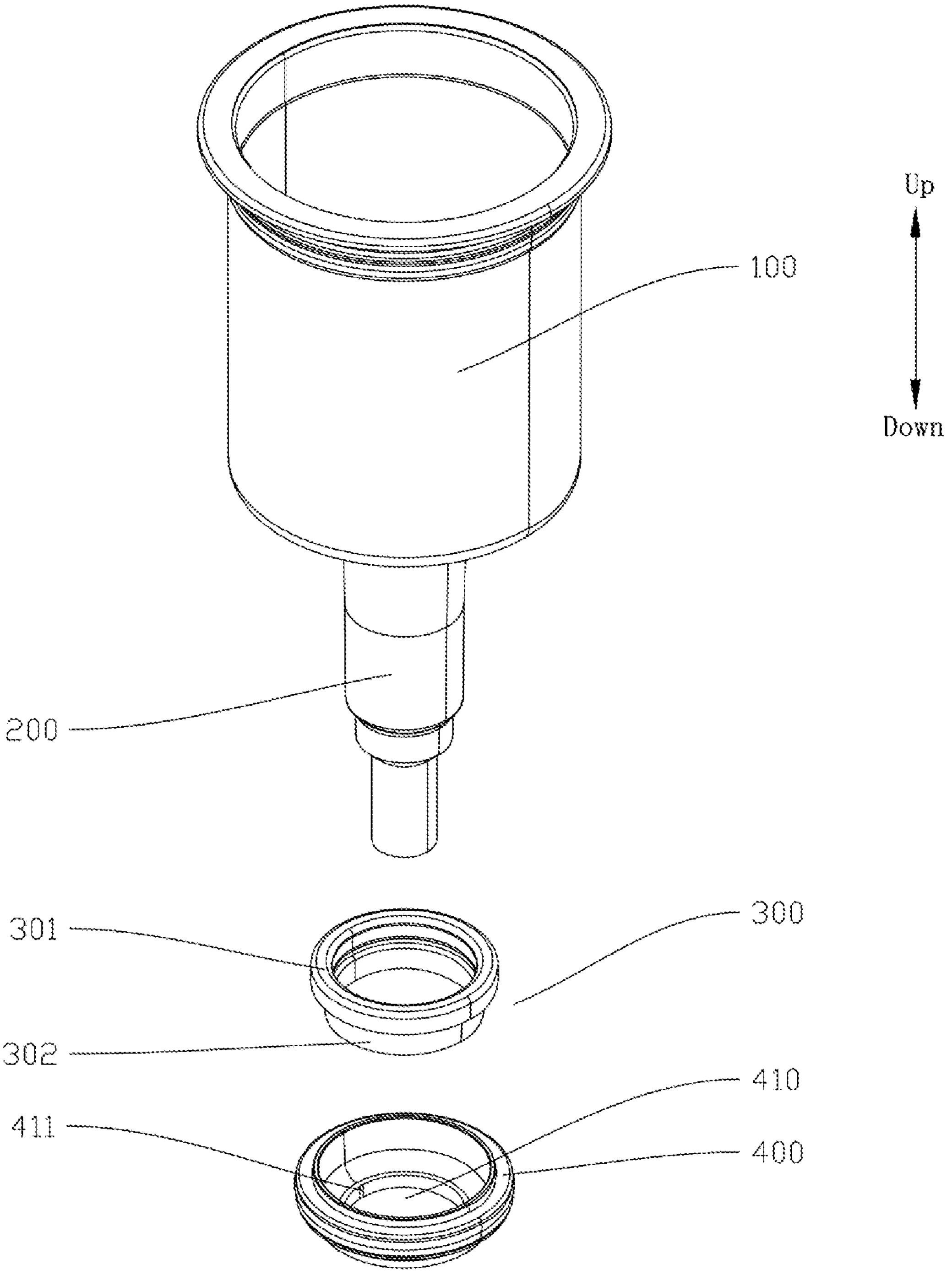
FIG. 1 is an exploded view of a pump body structure according to an embodiment of the disclosure.
Figure 2:
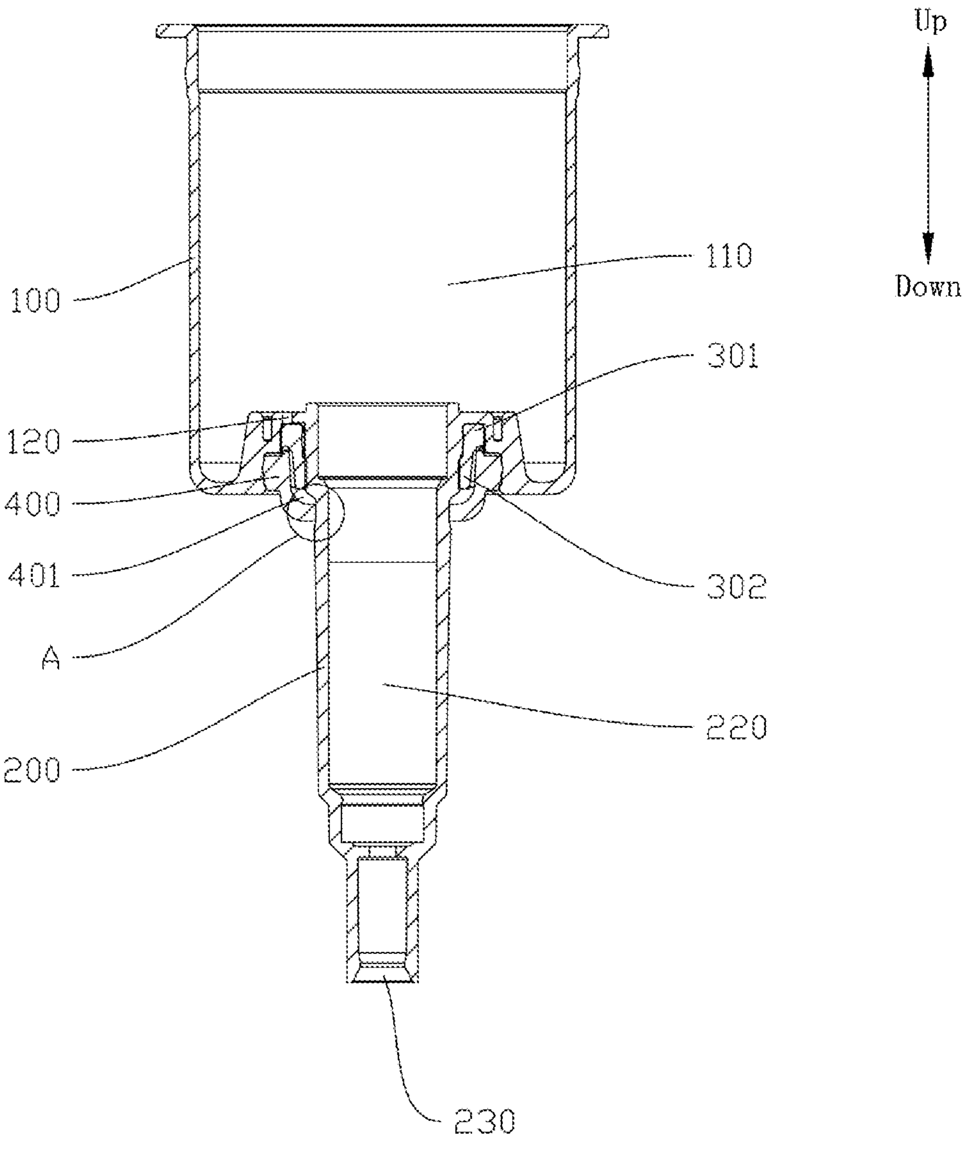
FIG. 2 is a cross-sectional view of the pump body structure according to an embodiment of the disclosure.
Figure 3:
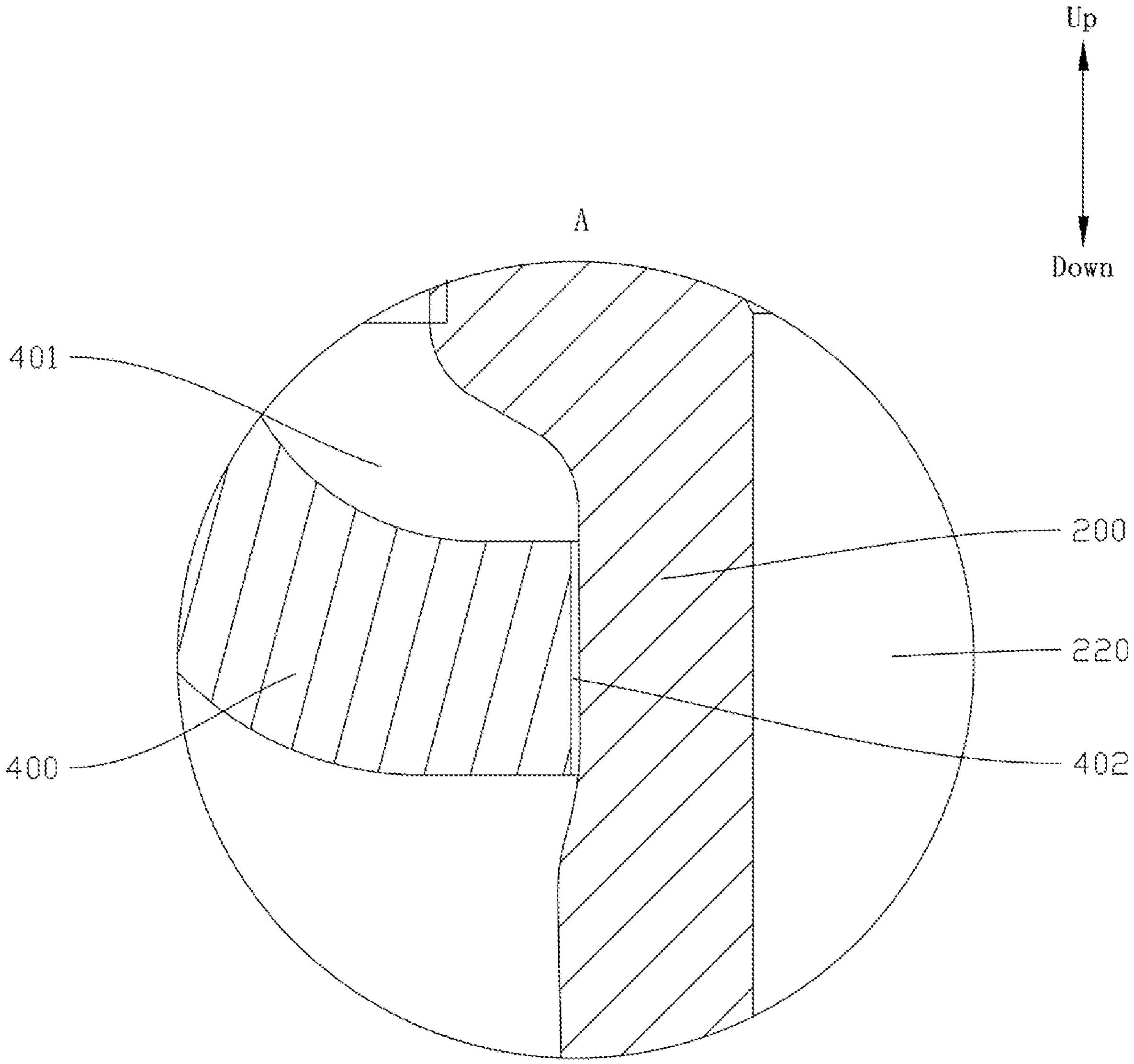
FIG. 3 is an enlarged view of part A in FIG. 2.
Figure 4:
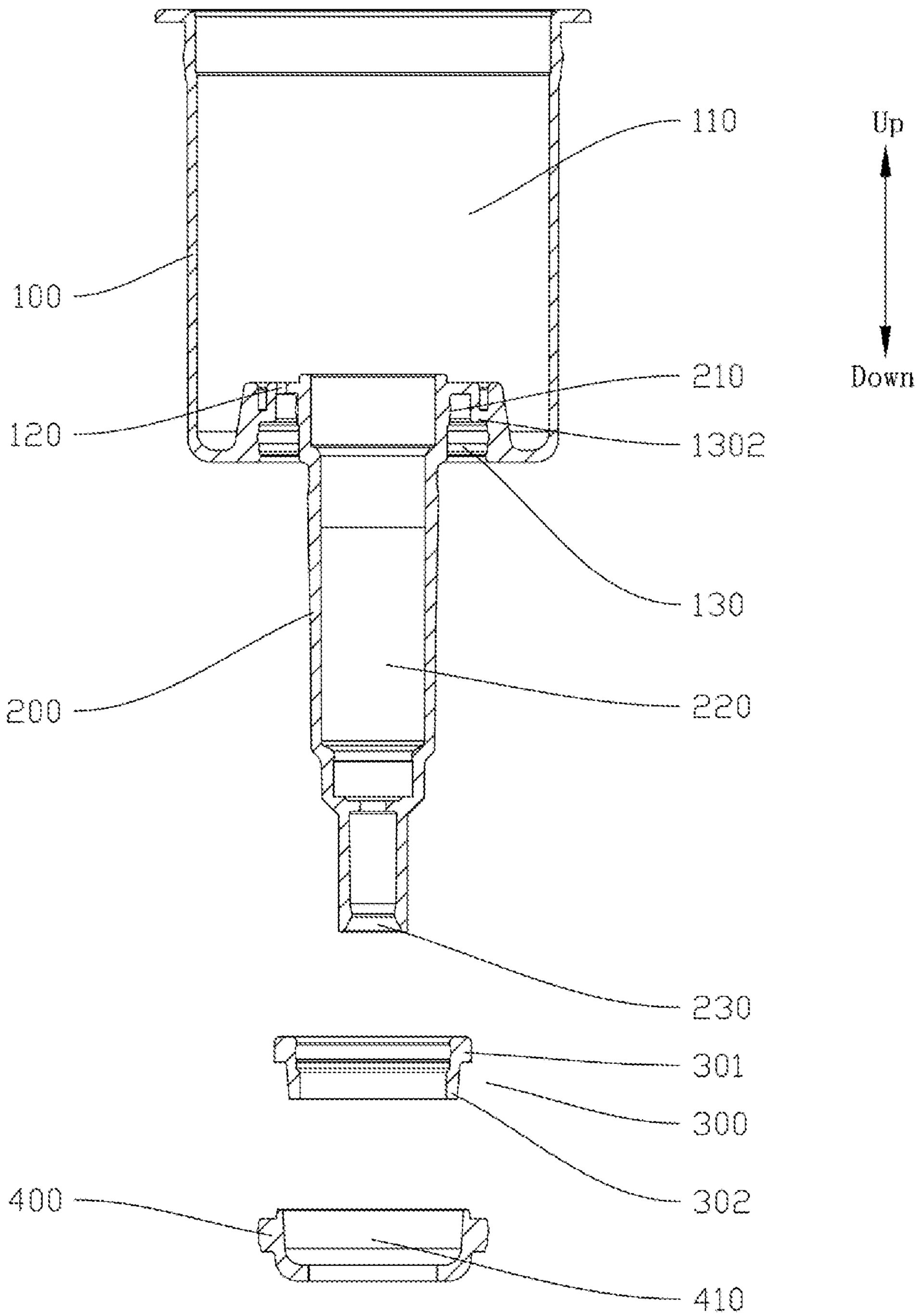
FIG. 4 is a cross-sectional view of the pump body structure when disassembled according to an embodiment of the disclosure.
Figure 5:
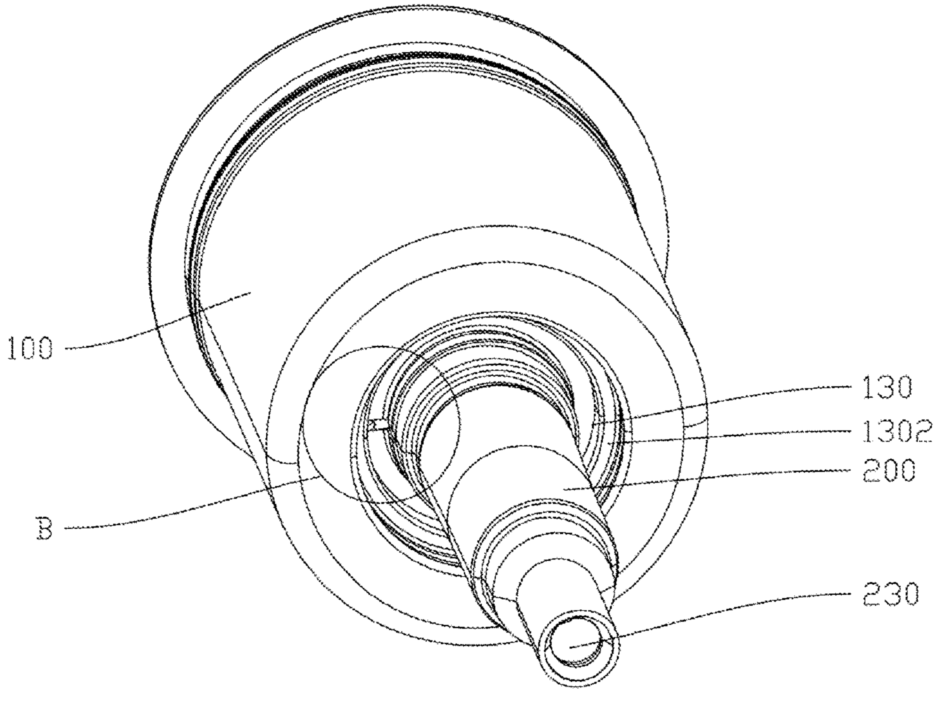
FIG. 5 is a schematic structural diagram of an air inlet cylinder in the pump body structure according to an embodiment of the disclosure.

100 refers to air inlet cylinder, 110 refers to air inlet cavity, 120 refers to air return hole, 130 refers to concave cavity, 1301 refers to first air guide groove, 1302 refers to annular step, 200 refers to liquid inlet cylinder, 2001 refers to second air guide groove, 210 refers to annular bulge, 220 refers to liquid inlet cavity, 230 refers to liquid inlet hole, 240 refers to one-way valve, 300 refers to elastic stop valve, 301 refers to upper portion, 302 refers to lower portion, 400 refers to lower cover, 401 refers to cavity, 402 refers to air return channel, 410 refers to assembly hole, 411 refers to groove, 500 refers to first piston assembly, 510 refers to mixing cavity, 520 refers to air inlet hole, 560 refers to first elastic valve sheet, 561 refers to inner valve sheet, 562 refers to outer valve sheet, 570 refers to second elastic valve sheet, 600 refers to second piston assembly, 610 refers to liquid outlet channel, 700 refers to foam generating mechanism, 800 refers to elastic member, 900 refers to upper cover, 910 refers to mounting seat, 920 refers to mounting space, 930 refers to sealing ring, 950 refers to pressing head, and 951 refers to spraying channel.

DETAILED DESCRIPTION

This section will describe the specific embodiments of the disclosure in detail, and the preferred embodiments of the disclosure are shown in the drawings. The drawings are used to supplement the description of the text part in the specification with the graphs, so that people can intuitively and vividly understand each technical feature and the overall technical solution of the disclosure, but the drawings cannot be understood as limiting the scope of protection of the disclosure.

In the description of the disclosure, it should be understood that, the orientational or positional relationships indicated by the terms such as “upper”, “lower”, “front”, “rear”, “left”, “right”, and the like, refer to the orientational or positional relationships shown in the drawings, which are only intended to facilitate description of the disclosure and simplify the description, and do not indicate or imply that the indicated devices or elements must have a specific orientation, be constructed and operated in a specific orientation, and therefore cannot be understood as a limitation of the disclosure.

In the description of the disclosure, the term "several" if any refers to being one or more, the term "multiple" refers to being two or more, and the terms "greater than", "less than", "more than", and the like are understood as not including this number, while the terms "above", "below", "within", and the like are understood as including this number.

In the description of the disclosure, the terms such as "arrangement", "mounting", "connection", and the like should be understood in a broad sense unless otherwise expressly limited, and those having ordinary skills in the art may reasonably determine the specific meanings of the above terms in the disclosure with reference to the specific contents of the technical solution.

With reference to FIG. 1 to FIG. 5, the following embodiments are made for a pump body structure of the disclosure.

The pump body structure includes an air inlet cylinder 100, a liquid inlet cylinder 200, an elastic stop valve 300 and a lower cover 400.

The air inlet cylinder 100 and the liquid inlet cylinder 200 are made of plastic by integrated injection molding, the liquid inlet cylinder 200 and the air inlet cylinder 100 both have a cylindrical structure, and an outer diameter of the air inlet cylinder 100 is greater than that of the liquid inlet cylinder 200. A bottom surface of the air inlet cylinder 100 is provided with an upwardly concave cavity 130, a top portion of the liquid inlet cylinder 200 is connected to a top wall of the concave cavity 130, and the concave cavity 130 is in an annular shape by surrounding a periphery of the liquid inlet cylinder 200 for one circle.

An air inlet cavity 110 extending up and down is arranged inside the air inlet cylinder 100 and a liquid inlet cavity 220 extending up and down is arranged inside the liquid inlet cylinder 200. A top portion of the air inlet cylinder 100 is open, a top portion of the liquid inlet cavity 220 is communicated with a bottom portion of the air inlet cavity 110, and a liquid inlet hole 230 communicating the liquid inlet cavity 220 with a space below is arranged in a bottom portion of the liquid inlet cylinder 200. A top wall of the concave cavity 130 is provided with an air return hole 120 communicating the air inlet cavity 110 with a space below: An outer side wall of the liquid inlet cylinder 200 is provided with a second air guide groove 2001 extending up and down, and the top wall of the concave cavity 130 is provided with a first air guide groove 1301. One end of the first air guide groove 1301 is communicated with a bottom portion of the air return hole 120, and the other end of the first air guide groove extends towards the liquid inlet cylinder 200 and is communicated with the second air guide groove 2001.

The lower cover 400 is provided with an assembly hole 410 extending vertically across the lower cover 400, the assembly hole 410 is a stepped hole with a big top and a small bottom, the assembly hole 410 is arranged around the liquid inlet cylinder 200, an aperture of a lower part of the assembly hole 410 is matched with an outer diameter of the liquid inlet cylinder 200, and the lower part of the assembly hole 410 is in interference fit with the liquid inlet cylinder 200. A shape of an outer side wall of the lower cover 400 is matched with a shape of an inner side wall of an annular step 1302 of the concave cavity 130, and the outer side wall of the lower cover 400 is hermetically connected with the inner side wall of the annular step 1302. A cavity 401 is formed by an upper part of the assembly hole 410, the outer side wall of the liquid inlet cylinder 200 and the top wall of the concave cavity 130, and the cavity 401 is in an annular shape arranged to surround the liquid inlet cylinder 200 for one circle.

The elastic stop valve 300 is in an annular shape, the elastic stop valve 300 is arranged in the cavity 401, and the elastic stop valve 300 is arranged around the liquid inlet cylinder 200 along the concave cavity 130. The outer side wall of the liquid inlet cylinder 200 is provided with an annular bulge 210, and an inner hole wall of the elastic stop valve 300 abuts against the annular bulge 210. The elastic stop valve 300 includes an upper portion 301 and a lower portion 302. A thickness of the upper portion 301 in an internal and external direction is greater than that of the lower portion 302 in an internal and external direction. A top portion of the upper portion 301 covers the air return hole 120 and the first air guide groove 1301, an inner side wall of the upper portion 301 covers the second air guide groove 2001, and the lower portion 302 extends downwardly along the outer side wall of the liquid inlet cylinder 200. A gap is reserved between the upper part of the assembly hole 410 and the lower portion 302, so that the lower portion 302 has n margin for outward expansion and deformation.

An inner side wall of the concave cavity 130 is provided with the annular step 1302, and the annular step 1302 expands outwardly to make a vertical cross-section shape of the concave cavity 130 show a stepped hole shape with a small top and a large bottom. The upper portion 301 is elastically pressed between the inner side wall of the concave cavity 130 and the outer side wall of the liquid inlet cylinder 200, and a gap is reserved between the outer side wall of the lower portion 302 and the inner side wall of the annular step 1302, so that the lower portion 302 can expand and deform outwardly by the margin. Moreover, the thickness of the upper portion 301 in the internal and external direction is greater than that of the lower portion 302 in the internal and external direction, which is convenient for air to flow downwardly through the air return hole 120, the first air guide groove 1301 and the second air guide groove 2001, and then push the lower portion 302 to expand and deform outwardly, so that the air can flow smoothly.

A top portion of the lower cover 400 abuts against a bottom portion of the upper portion 301, so that the elastic stop valve 300 is protected between the lower cover 400 and the concave cavity 130. An inner side wall of the assembly hole 410 is provided with a groove 411 extending vertically across the inner side wall, the groove 411 defines an air return channel 402 between the inner side wall of the assembly hole 410 and the outer side wall of the liquid inlet cylinder 200, and the air return channel 402 communicates the cavity 401 with the space below, so that the air flowing downwardly through the air return hole 120, the first air guide groove 1301 and the second air guide groove 2001 can expand the lower portion 302, and then flows downwardly through the air return channel 402.

The elastic blocking of the bottom portion of the air return hole 120 by the elastic stop valve 300 is realized by an elastic recovery property of the elastic stop valve 300 itself. When an air pressure above the air return hole 120 is greater than an air pressure in the cavity 401, air in the air return hole 120 squeezes the top portion of the elastic stop valve 300 to be deformed downwardly, resulting in a gap between the top portion of the elastic stop valve 300 and the bottom portion of the air return hole 120, so that the air can flow downwardly into the cavity 401 from the gap. When the air pressure above the air return hole 120 is equal to the air pressure in the cavity 401, the top portion of the elastic stop valve 300 recovers to an original state due to the elastic recovery property of the elastic stop valve 300 itself and blocks the bottom portion of the air return hole 120. When the air pressure above the air return hole 120 is less than the air pressure in the cavity 401, the air in the cavity 401 squeezes the elastic stop valve 300 to upwardly attach to the bottom portion of the air return hole 120, so that the bottom portion of the air return hole 120 is blocked.

In some embodiments, a bottom portion of the air inlet cylinder 100 is flat, the air return hole 120 extends vertically across the bottom portion of the air inlet cylinder 100, and the lower cover 400 is connected to the bottom portion of the air inlet cylinder 100. The cavity 401 is formed by the lower cover 400, the outer side wall of the liquid inlet cylinder 200 and a bottom wall of the air inlet cylinder 100, the elastic stop valve 300 is filled in the cavity 401, and a gap is reserved between the lower cover 400 and the liquid inlet cylinder 200, so that the elastic stop valve 300 may also be protected in the cavity 401 by the lower cover 400.

Figure 6:
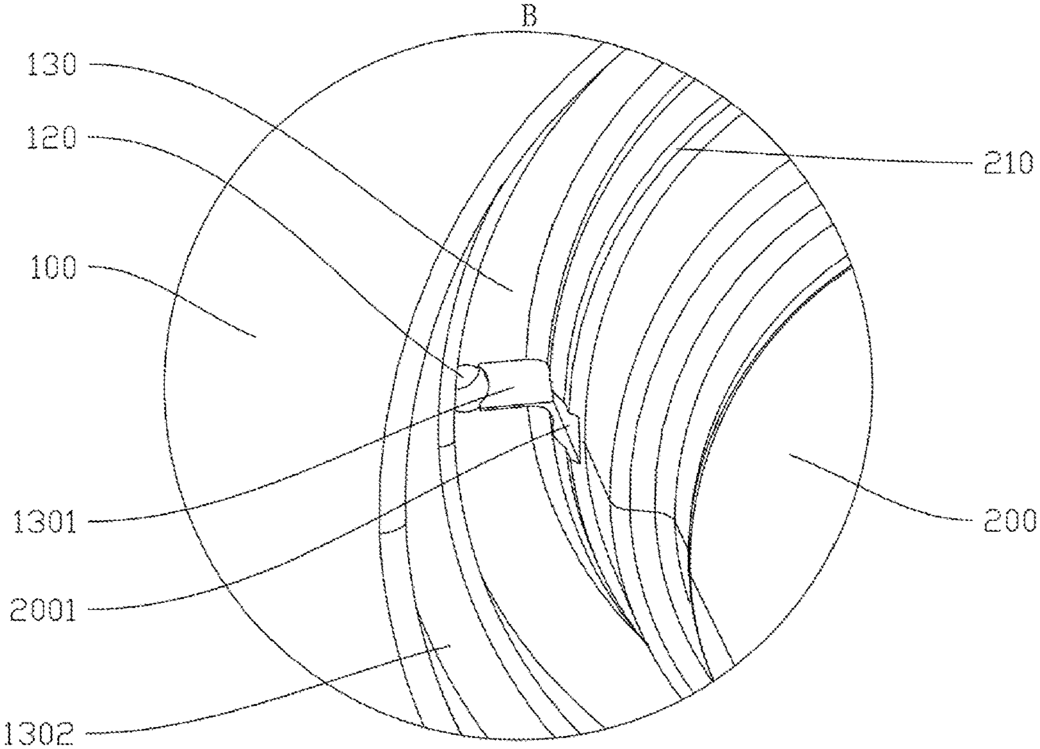
FIG. 6 is an enlarged view of part B in FIG. 5.
Figure 7:
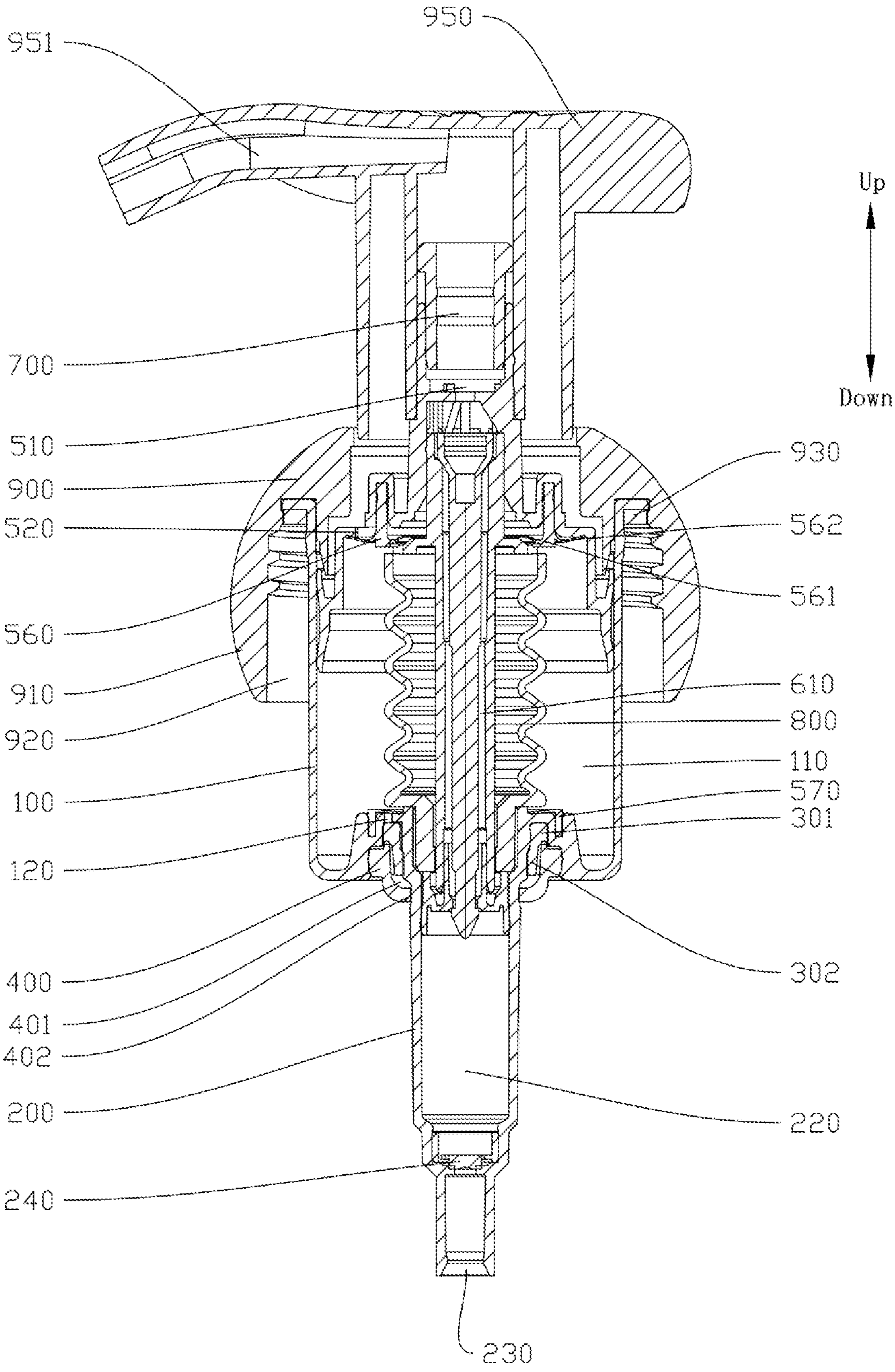
FIG. 7 is a cross-sectional view of a foam pump according to an embodiment of the disclosure.
Figure 8:
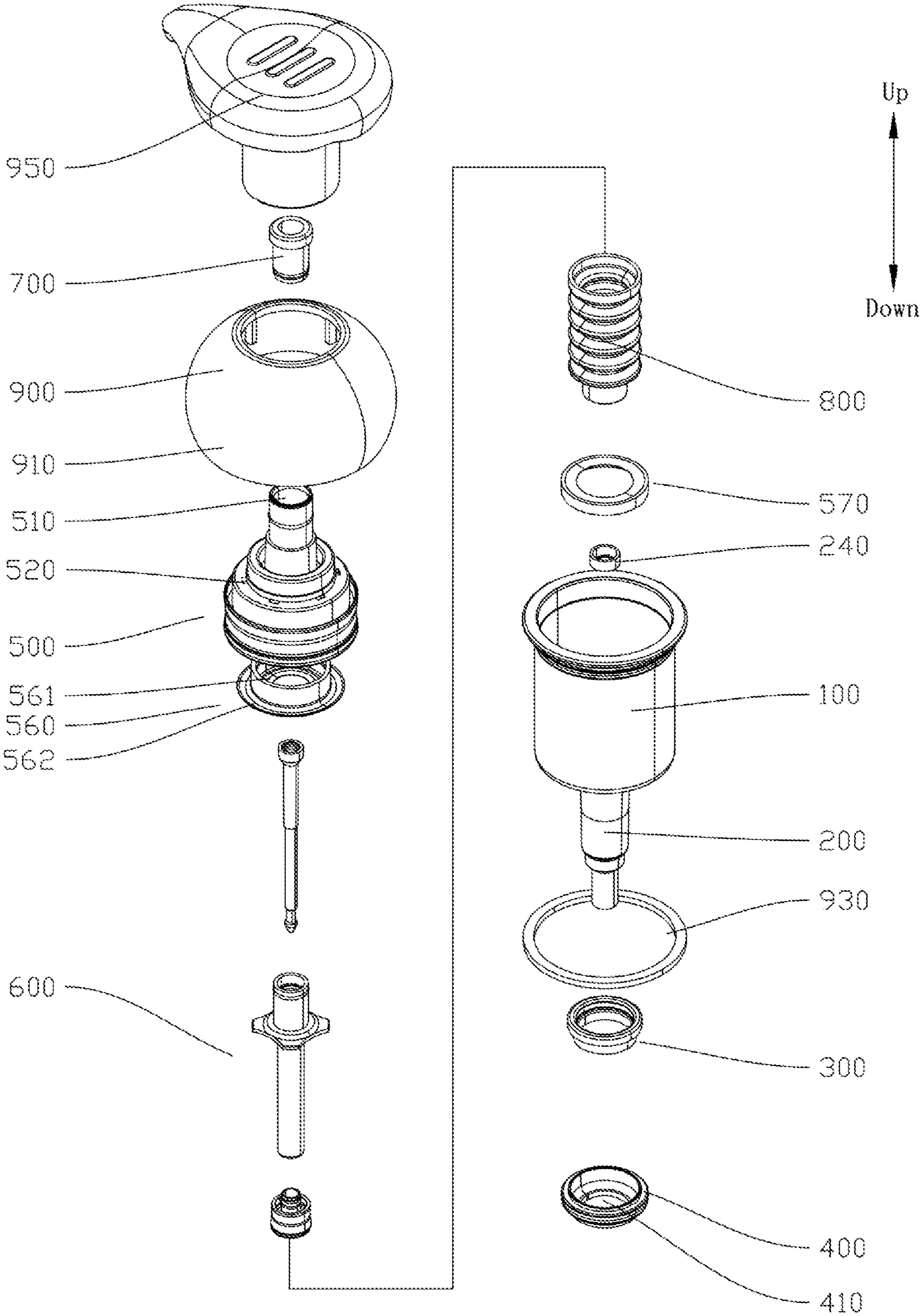
FIG. 8 is an exploded view of the foam pump according to an embodiment of the disclosure.
Figure 9:
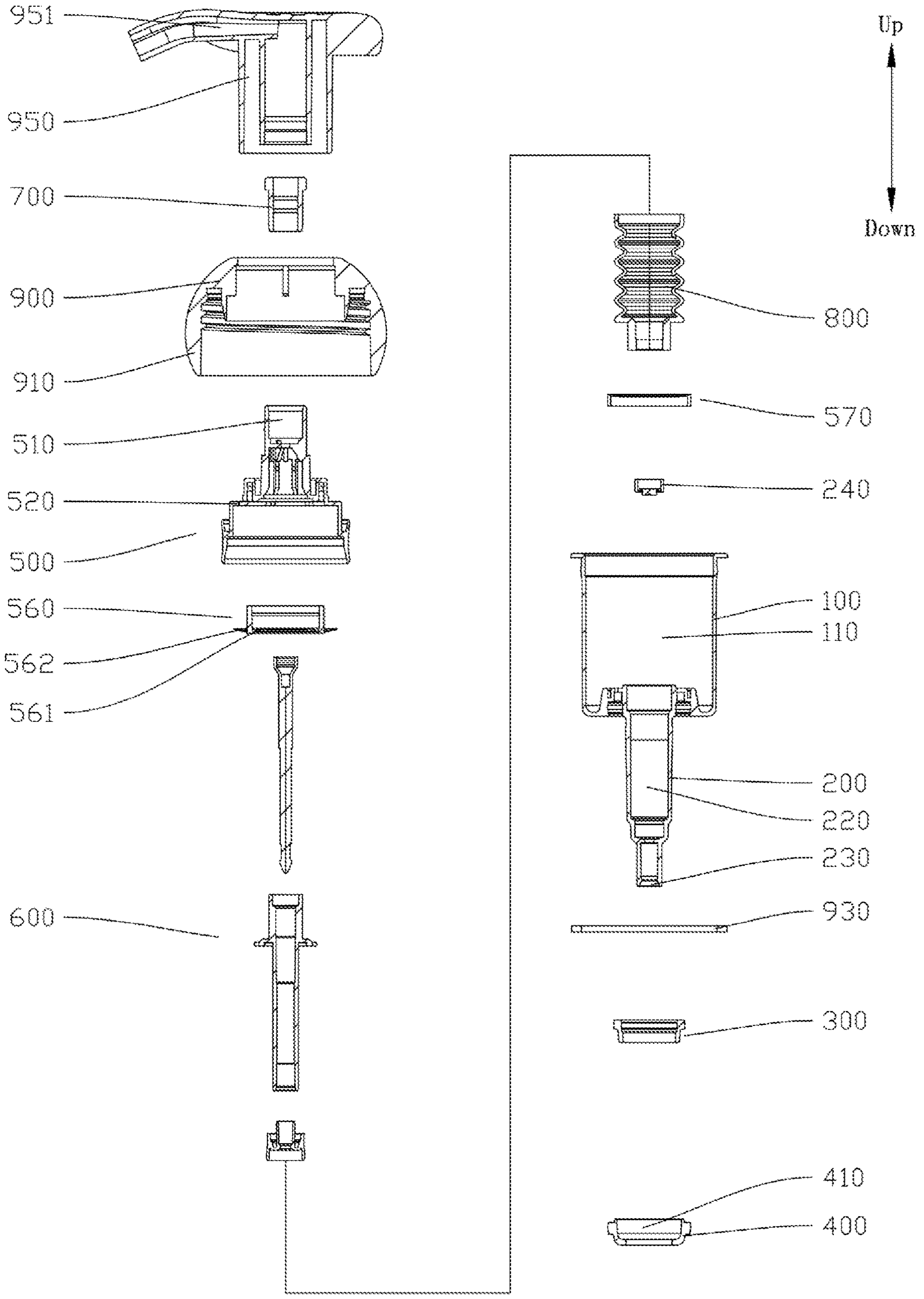
FIG. 9 is a cross-sectional view of the foam pump when disassembled according to an embodiment of the disclosure.

With reference to FIG. 6 to FIG. 8, the following embodiments are made for a foam pump of the disclosure.

The foam pump includes the pump body structure above, a one-way valve 240, a first piston assembly 500, a second piston assembly 600, a foam generating mechanism 700, an elastic member 800, an upper cover 900 and a pressing head 950.

The first piston assembly 500 is arranged in the air inlet cavity 110 in an up-down sliding manner, and a top portion of the first piston assembly 500 is provided with a mixing cavity 510 and an air inlet hole 520. The mixing cavity 510 extends vertically across a middle portion of the first piston assembly 500, a plurality of air inlet holes 520 are provided, and all of the air inlet holes 520 are distributed on a periphery of the mixing cavity 510 at intervals. An outer side wall of the first piston assembly 500 is sealed with the inner side wall of the air inlet cavity 110, a top portion of the second piston assembly 600 is connected to a bottom portion of the first piston assembly 500, a bottom portion of the second piston assembly 600 is arranged in the liquid inlet cavity 220 in an up-down sliding manner, and an outer side wall of the bottom portion of the second piston assembly 600 is sealed with the inner side wall of the liquid inlet cavity 220. A liquid outlet channel 610 is arranged in and extends vertically across a middle portion of the second piston assembly 600, and a top portion of the liquid outlet channel 610 is communicated with the mixing cavity 510 and a bottom portion of the liquid outlet channel 610 is communicated with the liquid inlet cavity 220. The one-way valve 240 is arranged in the liquid inlet cavity 220, the one-way valve 240 covers a top portion of the liquid inlet hole 230, and the one-way valve 240 has a flow direction from bottom to top.

A gap is reserved between an outer side wall of the top portion of the second piston assembly 600 and the first piston assembly 500 to form an air flow channel, and the air flow channel is communicated with the mixing cavity 510. The first piston assembly 500 further includes a first elastic valve sheet 560 and a second elastic valve sheet 570. The first elastic valve sheet 560 is connected to the first piston assembly 500, the first elastic valve sheet 560 is in an annular shape, and the first elastic valve sheet 560) includes an inner valve sheet 561 and an outer valve sheet 562. The inner valve sheet 561 covers a bottom portion of the air flow channel, and when the inner valve sheet 561 elastically recovers to an original state upwardly, the inner valve sheet 561 opens the bottom portion of the air flow channel downwardly. The outer valve sheet 562 covers the air inlet hole 520, and when the outer valve sheet 562 elastically recovers to an original state, the outer valve sheet 562 closes the air inlet hole 520 upwardly.

The second elastic valve sheet 570 is in an annular shape, the second elastic valve sheet 570 is connected to the bottom wall of the air inlet cavity 110, and the second elastic valve sheet 570) covers the top portion of the air return hole 120. When the second elastic valve sheet 570 elastically recovers to an original state, the second elastic valve sheet 270 closes the top portion of the air return hole 120 downwardly.

The foam generating mechanism 700 includes a cylinder extending vertically across the foam generating mechanism, an upper foam forming net and a lower foam forming net, and the upper foam forming net and the lower foam forming net cover a top end and a bottom end of the cylinder respectively. The foam generating mechanism 700 is arranged at a top end of the mixing cavity 510.

The elastic member 800 is a plastic spring, the elastic member 800 is arranged around the second piston assembly 600, and upper and lower ends of the elastic member 800 respectively abut against the top portion of the second piston assembly 600 and the bottom wall of the air inlet cavity 110.

The upper cover 900 is provided with a mounting hole arranged up and down, and a shape of the mounting hole corresponds to an opening at the top portion of the air inlet cylinder 100. The mixing cavity 510 of the first piston assembly 500 extends upwardly through the mounting hole, and the foam generating mechanism 700 is located above the mounting hole. The upper cover 900 is connected to the top portion of the air inlet cylinder 100, a mounting seat 910 extending towards an exterior of the air inlet cylinder 100 is arranged in a bottom portion of the upper cover 900, and the mounting seat 910 is arranged around the air inlet cylinder 100 for one circle. A mounting space 920 is formed between an inner side wall of the mounting seat 910 and the outer side wall of the air inlet cylinder 100, a sealing ring 930 is arranged in a top portion of the mounting space 920, and the inner side wall of the mounting seat 910 is provided with an internal thread.

The pressing head 950 is connected to a top end of the first piston assembly 500, the pressing head 950 is provided with a spraying channel 951 communicated with the mixing cavity 510, a bottom portion of the pressing head 950 is limited in the mounting hole of the upper cover 900, and the pressing head 950 may slide up and down along the mounting hole.

The foam pump is mounted on a mouth of a liquid storage container, the liquid inlet cylinder 200 and the air inlet cylinder 100 are inserted into the liquid storage container, the liquid inlet hole 230 is contacted with a liquid in the liquid storage container, the bottom wall of the air inlet cylinder 100 is higher than a liquid level in the liquid storage container, the mouth of the liquid storage container is inserted into the mounting space 920, an external thread of the mouth is matched with the internal thread of the mounting seat 910, and a top portion of the mouth is pressed against the sealing ring 930, so that the mouth is sealed.

When the foam pump is used, the pressing head 950 is pressed, so that the pressing head 950 pushes the first piston assembly 500 to move downwardly, and the first piston assembly 500 drives the second piston assembly 600 to move downwardly. The first piston assembly 500 compresses a space in the air inlet cavity 110 and the second piston assembly 600 compresses a space in the liquid inlet cavity 220, so that an air pressure in the air inlet cavity 110 is increased. The inner valve sheet 561 of the first elastic valve sheet 560 opens the air flow channel upwardly and the outer valve sheet 562 closes the bottom portion of the air inlet hole 520 upwardly, and the second elastic valve sheet 570) closes the top portion of the air return hole 120 downwardly, so that the air in the air inlet cavity 110 flows into the mixing cavity 510 through the air flow channel, and an air pressure in the liquid inlet cavity 220 is increased. The liquid in the liquid inlet cavity 220 flows upwardly into the mixing cavity 510 through the liquid outlet channel 610, so that the air and the liquid are mixed in the mixing cavity 510, and then form foam through the foam generating mechanism 700, and the foam is sprayed out from the spraying channel 951 of the pressing head 950.

When the pressing head 950 is released, the elastic member 800 pushes the second piston assembly 600 and the first piston assembly 500 to recover to original positions upwardly. Since the amount of the air in the air inlet cavity 110 is reduced and the amount of the liquid in the liquid inlet cavity 220 is reduced, the air pressure in the air inlet cavity 110 is lower than an external air pressure, and then the inner valve sheet 561 of the first elastic valve sheet 560) closes the air flow channel downwardly and the outer valve sheet 562 opens the bottom portion of the air inlet hole 520 downwardly, and the second elastic valve sheet 570 opens the top portion of the air return hole 120) upwardly, so that external air enters the air inlet cavity 110 from the air inlet hole 520. The amount of the liquid in the liquid inlet cavity 220 is reduced, so that the air pressure in the liquid inlet cavity 220 is lower than the air pressure in the liquid storage container, and then the liquid in the liquid storage container flows into the liquid inlet cavity 220 from bottom to top through the liquid inlet hole 230 and the one-way valve 240, so that the air pressure in the liquid inlet cavity 220 is balanced with the external air pressure. Since the amount of the liquid in the liquid storage container is reduced, the air pressure in the liquid storage container is lower than the air pressure in the air inlet cavity 110, and the second elastic valve sheet 570 is in a state of opening the top portion of the air return hole 120 upwardly, and the air in the air inlet cavity 110 passes through the air return hole 120, the first air guide groove 1301 and the second air guide groove 2001, and then pushes the lower portion 302 of the elastic stop valve 300 to be expanded outwardly, so that the air is supplemented into the liquid storage container, and the air pressure in the liquid storage container is balanced with the air pressure in the air inlet cavity 110.

When the foam pump and the liquid storage container are in a standing state, the mouth of the liquid storage container is sealed by the upper cover 900, the sealing ring 930, and the air inlet cylinder 100, while the second elastic valve sheet 570 closes the top portion of the air return hole 120, the upper portion 301 of the elastic stop valve 300 blocks the air return hole 120, the first air guide groove 1301 and the second air guide groove 2001, and the liquid in the liquid inlet cavity 220 squeezes the one-way valve 240 downwardly, so that the one-way valve 240 is in a state of closing the liquid inlet hole 230, thus hermetically preserving the liquid in the liquid storage container.

In some embodiments, the function of the foam pump may also be realized by manually pressing down the first piston assembly 500 or manually pulling up the first piston assembly 500, without arranging the elastic member 800.

In some embodiments, the elastic member 800 may be an elastic body capable of recovering to an original state after compression, such as a metal spring, elastic rubber and an elastic sponge.

The above describes the preferred embodiments of the disclosure in detail, but the disclosure is not limited to the embodiments. Those having ordinary skills in the art may further make various equivalent modifications or substitutions without violating the gist of the disclosure, and these equivalent modifications or substitutions are all included in the scope defined by the claims of the present application.

The invention claimed is:

1. A pump body structure, comprising:

an air inlet cylinder, wherein an air inlet cavity is arranged inside the air inlet cylinder, and an air return hole communicating the air inlet cavity with a space below the air inlet cylinder is arranged in a bottom portion of the air inlet cylinder;

a liquid inlet cylinder connected to the bottom portion of the air inlet cylinder;

a lower cover connected to the bottom portion of the air inlet cylinder, wherein a cavity is defined by the lower cover, an outer side wall of the liquid inlet cylinder and a bottom wall of the air inlet cylinder, and an air return channel communicating the cavity with a space below the lower cover is reserved between the lower cover and the liquid inlet cylinder; and an elastic stop valve arranged in the cavity, wherein the elastic stop valve is configured for elastically covering a bottom portion of the air return hole;

wherein the lower cover is provided with an assembly hole extending vertically across the lower cover, the assembly hole is arranged around the liquid inlet cylinder, the cavity is arranged to surround a periphery of the liquid inlet cylinder for one circle, the air return channel is located between an inner wall of the assembly hole and the outer side wall of the liquid inlet cylinder, the elastic stop valve is arranged around the liquid inlet cylinder along the cavity, and a top portion of the lower cover is arranged to abut against the elastic stop valve.

2. The pump body structure according to claim 1, wherein a bottom surface of the air inlet cylinder is provided with an upwardly concave cavity, the air return hole is located in a top wall of the concave cavity, a portion top of the liquid inlet cylinder is connected to the top wall of the concave cavity, and an outer side wall of the lower cover is hermetically connected with an inner side wall of the concave cavity.

3. The pump body structure according to claim 2, wherein the top wall of the concave cavity is provided with a first air guide groove communicated with the bottom portion of the air return hole, the first air guide groove is arranged to extend towards the liquid inlet cylinder, the outer side wall of the liquid inlet cylinder is provided with a second air guide groove extending up and down, the second air guide groove is communicated with the first air guide groove, a top portion of the elastic stop valve is arranged to elastically cover the air return hole and the first air guide groove, and an inner hole wall of the elastic stop valve is arranged to elastically cover the second air guide groove.

4. The pump body structure according to claim 3, wherein the elastic stop valve comprises an upper portion and a lower portion, the upper portion is arranged to be elastically pressed between the inner side wall of the concave cavity and the outer side wall of the liquid inlet cylinder, a top wall of the upper portion is arranged to elastically cover the air return hole and the first air guide groove, an inner side wall of the upper portion is arranged to elastically cover the second air guide groove, an inner side wall of the lower portion is attached to the outer side wall of the liquid inlet cylinder, a gap is reserved between an outer side wall of the lower portion and the lower cover, and the top portion of the lower cover is arranged to abut against a bottom portion of the upper portion.

5. The pump body structure according to claim 1, wherein an inner side wall of the assembly hole is hermetically connected with the outer side wall of the liquid inlet cylinder, the inner side wall of the assembly hole is provided with a groove extending vertically across the inner side wall, and the air return channel is formed between the groove and the outer side wall of the liquid inlet cylinder.

6. The pump body structure according to claim 1, wherein the outer side wall of the liquid inlet cylinder is provided with an annular bulge, and an inner hole wall of the elastic stop valve is arranged to abut against the annular bulge.

7. A foam pump, comprising:

the pump body structure according to claim 1, wherein a liquid inlet cavity is arranged inside the liquid inlet cylinder, and a liquid inlet hole communicated with outside is arranged in the bottom portion of the liquid inlet cylinder;

a first piston assembly arranged in the air inlet cavity in an up-down sliding manner, wherein a mixing cavity communicated with a space above is arranged in a top portion of the first piston assembly;

a second piston assembly, wherein a top portion of the second piston assembly is connected with the first piston assembly, a bottom portion of the second piston assembly is arranged in the liquid inlet cavity in an up-down sliding manner, and the top portion of the first piston assembly is communicated with the mixing cavity;

a foam generating mechanism arranged in the mixing cavity; and a one-way valve covering the liquid inlet hole, wherein the one-way valve has a flow direction from bottom to top.

8. The foam pump according to claim 7, wherein the foam pump further comprises an upper cover, the upper cover is connected to the top portion of the air inlet cylinder, a mounting seat extending towards an exterior of the air inlet cylinder is arranged in a bottom portion of the upper cover, the mounting seat is arranged around the air inlet cylinder for one circle, a mounting space is formed between an inner side wall of the mounting seat and the outer side wall of the air inlet cylinder, and a sealing ring is arranged in a top portion of the mounting space.

9. The foam pump according to claim 7, wherein the foam pump further comprises an elastic member, the elastic member is a plastic spring, the elastic member is arranged in the air inlet cavity, and upper and lower ends of the elastic member are arranged to respectively abut against the top portion of the second piston assembly and a bottom wall of the air inlet cavity.

* * * * *